May 5, 1936.　　　F. H. NICHOLSON　　　2,039,827
ELECTRIC CONTROL SYSTEM
Filed Nov. 14, 1931
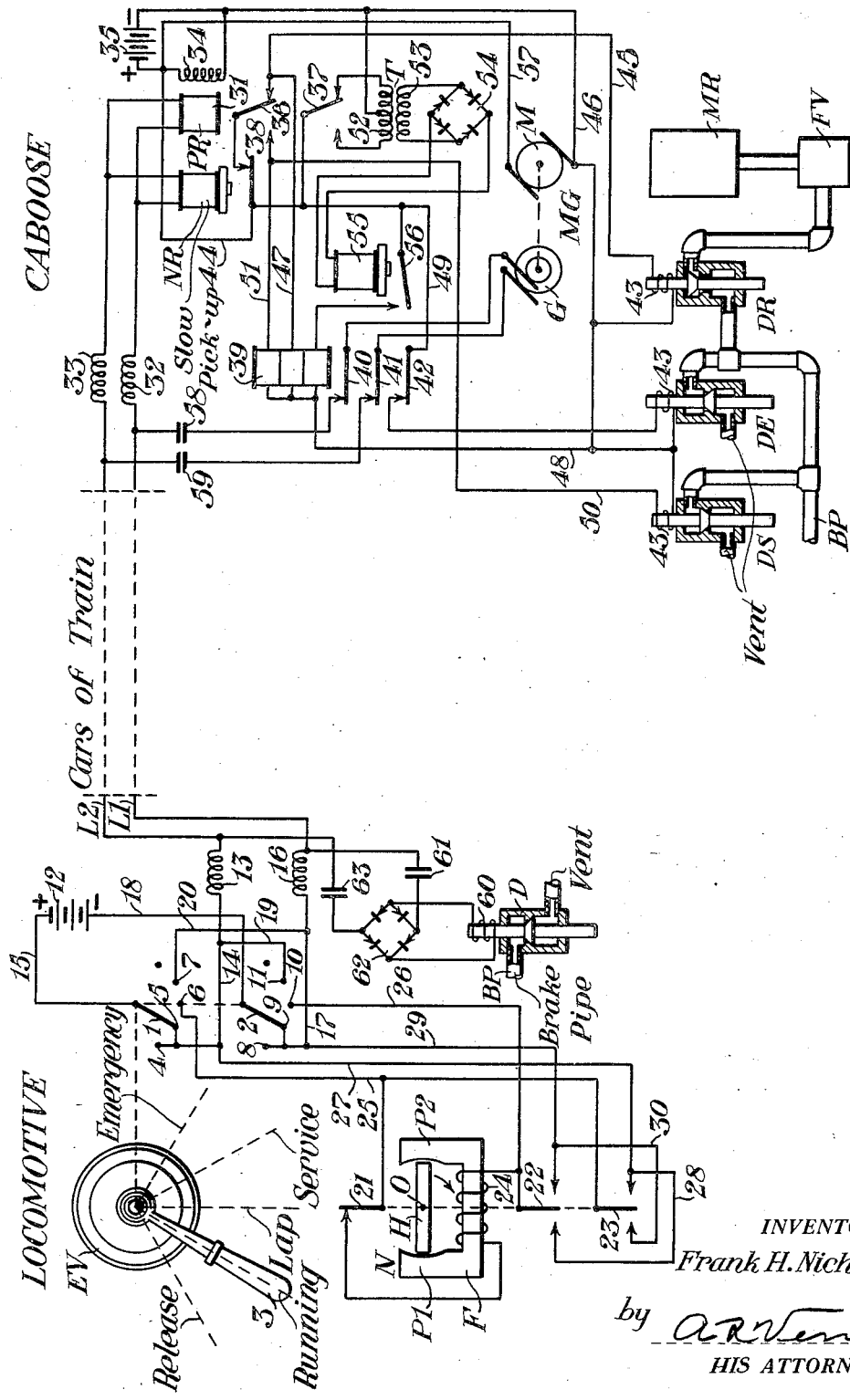
INVENTOR.
Frank H. Nicholson.
by A. R. Vencill
HIS ATTORNEY.

Patented May 5, 1936

2,039,827

UNITED STATES PATENT OFFICE 2,039,827

ELECTRIC CONTROL SYSTEM

Frank H. Nicholson, Edgewood, Pa., assignor to The Union Switch & Signal Company, Swissvale, Pa., a corporation of Pennsylvania Application November 14, 1931, Serial No. 575,096

15 Claims. (Cl. 303—20)

My invention relates to electric control systems, and particularly to electric control systems for the control of the brakes of railway trains.

I will describe one form of apparatus embodying my invention, and will then point out the novel features thereof in claims.

A practical embodiment of my invention is represented diagrammatically in the accompanying drawing.

In handling long trains, especially long freight trains, it is difficult to stop the train smoothly due to the slack action between the cars and because a relatively long interval of time elapses between the time the brakes are applied at the head end and the time the brake action becomes effective at the rear end. It has been found that a much smoother handling of a long train can be accomplished when the air brakes are governed from each end of the train if action of the equipment at the two ends is obtained substantially simultaneously. In my system substantially simultaneous action of the air brakes of a train is obtained at both ends of a train by means of a single conducting channel for electric energy extending from one end of the train to the other. In the form of the invention here shown this conducting channel consists of two metallic conductors extending from the front end to the rear end of the train. The different operating conditions of the air brakes established by the controlling operator at the head end of the train are simultaneously reproduced automatically by an independent auxiliary brake controlling mechanism at the rear end of the train in response to different conditions of electric energy of a given characteristic applied to the conducting channel. A return indication to the front end of a train showing that the auxiliary mechanism has properly functioned is effected by superimposing on the conducting channel electric energy having a different characteristic from that used for controlling the auxiliary brake mechanism.

In the accompanying drawing the apparatus shown at the left-hand end of the figure is that mounted at the control point, which, in this instance, is on the locomotive. The apparatus shown at the right-hand end of the figure is that located at a second point on the train. While this apparatus may be at any point on a train it will be referred to in this description as being mounted in the caboose of a freight train. The two metallic conductors which serve as a conducting channel for electric energy between the locomotive and the caboose are indicated by the dotted lines shown at the central part of the figure.

The locomotive is provided with the usual standard engineer's brake valve designated by the reference character EV, which is adapted to establish in the usual manner the several brake conditions, release, running, lap, service and emergency. As shown schematically the contact arms 1 and 2 are connected to and actuated by the handle 3 of the valve EV. The contact arm 1 is adapted to engage contacts 4, 5, 6 and 7 in the release, running, lap and service positions, respectively. The contact arm 2 is adapted to engage the contacts 8, 9, 10 and 11 in the release, running, lap and service positions, respectively. A source of direct current, such as a battery 12 is provided on the locomotive. When the handle 3 occupies either the release or running positions the control wire L2, which serves as one side of the conducting channel, is connected to the positive terminal of the battery 12 through a reactor 13, wire 14, contact 4 or 5, contact arm 1 and wire 15. The control wire L1, which serves as the other side of the conducting channel, is connected to the negative terminal of the battery 12 under the release and running positions of handle 3 through a reactor 16, wire 17, contact 8 or 9, contact arm 2 and wire 18. In the service position of the handle 3 the polarity of the control wires L1 and L2 is reversed. Control wire L2 is now connected to the negative terminal of the source of power through reactor 13, wire 19, contact 11, contact arm 2 and wire 18, while the control wire L1 is connected to the positive terminal of the source of power through reactor 16, wire 20, contact 7, contact arm 1 and wire 15.

On the locomotive there is provided a mechanically tuned oscillator or coder N. This coder may take any one of many well-known forms but a preferred form is that disclosed in the Paul N. Bossart application for Letters Patent, Serial No. 398,342, filed October 9, 1929, and it will suffice for this description to say that it consists of a field structure F between the poles P1 and P2 of which there is mounted an armature H pivoted at O. The armature H is biased to a given position by a spring not shown, such as the midposition where the contact members 21, 22 and 23 actuated by armature H occupy the position shown in the drawing. The field winding 24 is adapted to be energized by direct current from the battery 12 whenever the handle 3 of the valve EV is moved to the lap position by a circuit that can be traced from the positive terminal of battery 12 along wire 15, contact arm 1, contact 6, wire 25, contact member 21, field winding 24, wire 26, contact 10, contact arm 2 and wire 18 to the negative terminal of battery 12. With the field winding 24 energized the armature H will rotate in the direction indicated by the arrow until the contact member 21 is swung to the right a sufficient distance to disengage its contact and rupture the circuit to the field winding 24. Armature H will rotate a little farther by virtue of its inertia and then reverse its movement due to the bias until the circuit to the field winding 24 is again closed at the contact member 21 to re-energize the field winding. During its reverse movement the armature H will move somewhat past its normal position due to its inertia. While armature H is being swung by the action of the field winding 24 the contact members 22 and 23 are each swung to the left to engage left-hand contacts, while when the armature H swings past its normal position during its reverse movement the contact members 22 and 23 are swung to the right to engage right-hand contacts. The biasing and the weight of the armature H are so selected that it will have a natural period of oscillation of some convenient frequency, say eighty cycles per minute.

Under the lap position of handle 3 the control wire L2 is connected to the positive terminal of the battery 12, during one movement of armature H, through reactor 13, wires 14 and 27, right-hand contact of 23, wire 25, contact 6, contact arm 1 and wire 15, and is then connected to the negative terminal of the battery 12, during the other movement of the armature H, through reactor 13, wires 14, 27 and 28, left-hand contact of 22, wire 26, contact 10, contact arm 2 and wire 18. In a like manner the control wire L1 is alternately connected to the positive and negative terminals of battery 12 under the lap position of the handle 3 by the operation of the coder N. When the contact member 22 swings to the right, control wire L1 is connected to the negative terminal of battery 12 through reactor 16, wires 17 and 29, right-hand contact of 22, wire 26, contact 10, contact arm 2 and wire 18, while when the control member 23 swings to the left it is connected to the positive terminal of battery 12 through reactor 16, wires 17, 29 and 30, left-hand contact of 23, wire 25, contact 6, contact arm 1 and wire 15. It follows that under the lap position of the handle 3 the control wires L1 and L2 are alternately made positive and negative once each cycle of the coder N.

In the emergency position of the brake valve EV the handle 3 moves the contact arms 1 and 2 away from all contacts, and the control wires L1 and L2 are left without energy.

The caboose is provided with a three-position, two-element direct current polarized relay PR and a slow pick-up direct current neutral relay NR. The winding 31 of the relay PR has its two terminals connected to the control wires L1 and L2 through the reactors 32 and 33, respectively. The second winding 34 of relay PR has its two terminals permanently connected to a source of direct current such as a battery 35. The winding of the relay NR is connected in parallel with the winding 31 of relay PR to the control wires L1 and L2. The polarity of the magnetic fields created by the windings 31 and 34 of relay PR are such that when the control wire L2 is positive and the control wire L1 is negative, the polarized armatures 36 and 37 are swung to the right, that is to the position shown in the drawing. When the polarity of the control wires L1 and L2 is reversed the armatures 36 and 37 are swung to the left, that is to the position opposite that shown in the drawing. When the control wires L1 and L2 are without energy the armatures 36 and 37 take a vertical position midway between the contacts. The neutral relay NR will lift the armature 38 into engagement with a front contact when it is energized with current of either polarity for the control wires L1 and L2. Due to its slow pick-up characteristic relay NR will not lift its armature 38, however, until some predetermined time after its winding is energized. The caboose apparatus includes a direct current neutral relay 39 provided with three separate windings and which is so constructed that when any one of the windings is energized its armatures 40, 41 and 42 are brought into engagement with front contacts. The function of this relay and the manner of energizing its windings will appear as the specification progresses.

The caboose is equipped with an auxiliary brake controlling mechanism which includes a main reservoir MR, a feed valve FV, and electropneumatic valves DR, DE and DS. The caboose, of course, will also be equipped with a compressor, pressure gages and all other apparatus necessary to insure an ample supply of air pressure in the main reservoir MR entirely independent of the supply of air pressure on the locomotive. The valves DR and DS are each biased to a closed position and each is lifted to an open position when its associated magnet 43 is energized. The valve DE is biased to an open position and is held closed when its magnet 43 is energized. When the valve DR is opened by its magnet 43 being energized, the brake pipe BP is connected to the feed valve FV and the auxiliary brake controlling mechanism reproduces the usual running condition of the engineer's brake valve EV on the locomotive. When the valve DS is opened by its magnet 43 being energized the brake pipe BP is connected to the atmosphere through a vent of such characteristics as to produce a reduction of brake pipe pressure at substantially the service rate of reduction of the engineer's brake valve to effect a service application of the brakes. When the valve DE is opened by its magnet 43 being deenergized, the brake pipe BP is connected to atmosphere through a vent of such characteristics as to produce the emergency rate of reduction of the brake pipe pressure and an emergency application of the brakes. When the valve DE is held closed by the energizing of its magnet and the valves DR and DS are both closed as a result of their magnets being deenergized, both the supply and the exhaust of the brake pipe are blanked and the auxiliary mechanism reproduces the lap condition of the engineer's brake valve.

With the control wires L2 and L1 made positive and negative, respectively, as the result of the handle 3 being placed at the running or release position, the relays PR and NR are energized with the armatures 36 and 37 occupying the right-hand position and armature 38 engaging its front contact. Under these circumstances current is supplied to the magnet 43 of the valve DR by a circuit extending from the positive terminal of battery 35 along wire 44, front contact of armature 38 of relay NR, right-hand contact of armature 36 of relay PR, wire 45, magnet 43 of valve DR and wire 46 to the negative terminal of battery 35. Current will also flow from the right-hand contact of armature 36 along wire 47, center winding of relay 39 and wires 48 and 46 to the negative terminal of battery 35. With relay 39 energized current is supplied to the magnet 43 of valve DE from positive terminal of battery 35 along wires 44 and 49, front contact of armature 42 of relay 39, magnet 43 of valve DE and wire 46 to the negative terminal of battery 45. With the magnets of DR and DE both energized the auxiliary brake controlling mechanism is in a position to reproduce the running condition of the brake pipe pressure that has been established by the valve EV on the locomotive.

With the control wires L1 and L2 made positive and negative, respectively, in response to the handle 3 being moved to the service position, the relay NR will be energized the same as before but the polarized armatures 36 and 37 of relay PR are reversed to the left-hand position. Under these circumstances the circuit to the magnet 43 of the valve DR is open and a circuit is closed to the magnet 43 of the valve DS. This circuit for the magnet 43 of the valve DS extends from the positive terminal of battery 45 along wire 44, front contact of armature 38 of relay NR, left-hand contact of armature 36 of relay PR, wire 50, magnet 43 of valve DS and wire 46 to the negative terminal of battery 35. There is a path branching from the wire 50 along wire 51, top winding of relay 39 and wires 48 and 46 to the negative terminal of battery 35. Relay 39 remains picked up to close the circuit to the magnet 43 of valve DE to hold that valve closed, while with the magnet 43 of the valve DR deenergized and valve DR closed and the magnet 43 of the valve DS energized so that valve DS is now open the auxiliary brake mechanism reproduces the service application condition established by the valve EV on the locomotive.

When the handle 3 of the brake valve EV is placed at the lap position and the circuit closed to the winding 24 of the coder N, the control wires L1 and L2 are alternately made positive and negative each cycle of the coder, as pointed out above. This periodic pole changing of the polarity of the direct current applied to the wires L1 and L2 causes the armatures 36 and 37 of the polarized relay PR to alternately assume the left-hand and the right-hand positions. The slow pick-up characteristic of the relay NR is made longer than the time of a cycle of the coder N and thus that relay does not now pick up. With the armature 37 of relay PR alternately swung between the left and right-hand positions current is alternately supplied to the two halves of the primary winding 52 of a transformer T. The circuit is from the positive terminal of battery 35 through wire 44, right-hand contact of armature 37, right-hand half of primary 52 and wire 46 to the negative terminal of battery 35 and when armature 37 is swung to the left the circuit is completed through the left-hand half of primary 52 and the wire 46 to the negative terminal of battery 35. The low frequency alternating current induced in the secondary 53 of the transformer T by the alternate energizing of the two halves of the primary 52 is rectified by a full-wave rectifier 54 and applied by a circuit easily traced to the winding of a slow-release relay 55 to energize that relay. With relay 55 energized current flows to the bottom winding of relay 39 from the positive terminal of battery 35 through wire 44, front contact of armature 56 of relay 55, bottom winding of relay 39 and wires 48 and 46 to the negative terminal of battery 35. As relay NR is not picked up under the lap condition, neither magnet for the valves DS or DR is energized and both of these valves are held closed by their biasing element. With relay 39 retained energized the circuit to the magnet for the valve DE is still retained closed so that that valve is held closed. It follows that the auxiliary mechanism reproduces the lap condition set up by the brake valve EV.

When handle 3 is moved into the emergency position no current flows to the control wires L1 and L2 and all apparatus at the caboose becomes deenergized. As magnet 43 of valve DE becomes deenergized that valve is opened and the auxiliary brake mechanism establishes an emergency brake application condition at the caboose the same as has been established by the valve EV on the locomotive.

We see, therefore, that the relative polarity of the direct current supplied to the control wires L1 and L2 under the running and service positions of handle 3 effects the running and the service brake condition of the auxiliary mechanism, while when the lap position is selected for handle 3 and the coder N brought into play to alternately reverse the polarity of the current supplied to the wires L1 and L2 the auxiliary brake mechanism in the caboose effects a lap condition. When the emergency position of handle 3 is selected no energy is supplied to the control wires L1 and L2 and the caboose apparatus becomes deenergized to establish an emergency brake condition.

On the caboose there is provided a motor-generator MG the generator G of which supplies alternating current of any convenient frequency, such for example as sixty cycles per second. The motor M of the motor-generator set is supplied with current from the battery 35 over the wires 46 and 57. Whenever relay 39 is energized one terminal of the generator G is connected to the control wire L1 through the front contact of armature 40 of relay 39 and a condenser 58, and the other terminal of the generator G is connected to the control wire L2 through the front contact of armature 41 and a condenser 59. The connection of the generator G to the control wires L1 and L2 is made on the side of the reactors 32 and 33 opposite the relays PR and NR so that the alternating current does not effect the operation of these relays. The condensers 58 and 59 serve to block out the direct current from the generator G. As the relay 39 is energized under the running, lap and service conditions of the caboose equipment it follows that alternating current is fed to the control wires L1 and L2 from the generator G under all brake conditions except the emergency condition in which relay 39 is deenergized. This alternating current when applied to the control wires L1 and L2 energizes a magnet 60 on the locomotive by means of a circuit from L1 through condenser 61, one side of a full-wave rectifier 62, magnet 60, the other side of the rectifier 62 and condenser 63 to the control wire L2. The blocking condensers 61 and 63 keep the direct current supplied by battery 12 to the wires L1 and L2 from actuating the magnet 60, while the reactors 13 and 16 keep the alternating current from circulating through the direct current apparatus on the locomotive. The magnet 60 may be made to actuate any indicating device, but I prefer that it actuate an electropneumatic valve D. The electropneumatic valve D is biased to an open position and is held closed by the energizing of the magnet 60. When the valve D is open the brake pipe BP on the locomotive is connected to the atmosphere through a vent of such characteristics that the usual emergency rate of reduction of brake pipe pressure is effected to establish an emergency application of the brakes. It will be understood that the vent of the valve D can be so constructed as to provide a service rate of reduction of the brake pipe pressure if it seems desirable to do so, or as stated above, the magnet 60 can be made to operate any indicating device desired.

To sum up the operation of my system, the placing of the engineer's brake valve EV at either the release or running condition causes direct current of a given polarity to be applied to the control wires leading to the rear end of the train. This direct current so energizes a neutral and a polarized relay in the caboose that a circuit is closed to the magnet of a valve DR and to one winding of a relay 39 and relay 39 in turn closes the circuit to the magnet of the emergency valve DE. The result is that the valve DR is open, and valves DE and DS closed so that the auxiliary brake mechanism sets up a running condition of the brake pipe pressure. When a service application is made by the operator of the valve EV the polarity of the direct current supplied to the control wires L1 and L2 is reverse from that established under the running condition. This reverse polarity of direct current so energizes the polarized relay in the caboose that a circuit is closed to the magnet of valve DS and to a second winding of the relay 39, and the circuit is opened to the magnet of valve DR. Relay 39 is thus retained energized to effect the closing of the valve DE but as the valve DS is now open and valve DR is closed, the auxiliary brake mechanism establishes a service application condition of the brake pipe pressure. When the operator of the valve EV laps the handle 3 the polarity of the direct current supplied to the control wires L1 and L2 is alternated periodically which causes operation of the polarized relay PR in the caboose but fails to pick up the neutral relay NR due to the slow pick-up feature of that relay. This operation of the polarized relay PR causes a relay 55 to be energized that in turn closes a circuit to a third winding of a relay 39 so that the valve DE is still retained closed. Both valves DR and DS are closed by their biasing elements as their magnets are now deenergized due to the fact that relay NR is down. This condition of the valves of the auxiliary brake mechanism results in a lap condition being established for the brake pipe pressure. When the valve EV is moved to the emergency position no energy is applied to the control wires L1 and L2 and the caboose apparatus becomes deenergized causing the auxiliary brake mechanism to set up an emergency condition of the brake pipe pressure. Thus the several operating conditions of the engineer's brake valve are substantially simultaneously reproduced in the caboose by the auxiliary brake controlling mechanism. As long as the caboose equipment is properly functioning alternating current is applied to the control wires L1 and L2 by a generator in the caboose to establish a return indication. The alternating current superimposed on the direct current is rectified and applied to a magnet of a brake controlling valve on the locomotive which indicates the condition of the auxiliary mechanism. If there is a failure of the caboose apparatus or if there occurs a broken control wire or a cross between these two wires the brake valve D on the locomotive and the emergency valve DE in the caboose will establish simultaneously an emergency application of the brakes.

Such a system for the control of the brakes of a train as here disclosed allows controlling energy to flow in both directions at the same time from the two ends of a train with the result that the controlling and the indicating apparatus can be made simple and operated with a high degree of reliability. The method of controlling the brake pipe pressure here proposed insures that each of the several operating brake conditions will be established substantially simultaneously at each end of a train insuring thereby smooth and safe handling of the train under all traffic conditions.

Although I have herein shown and described only one form of apparatus embodying my invention, it is understood that various changes and modifications may be made therein within the scope of the appended claims without departing from the spirit and scope of my invention.

Having thus described my invention, what I claim is:

1. A brake control system for railway trains including, a single metallic circuit extending from the front end to the rear end of a train with a source of electric current of one character at the front end and a source of electric current of a different character at the rear end, a manually operated means at the front end to govern the supply of current from the source at the front end, a brake controlling mechanism at the rear end connected to the circuit responsive only to current of the character supplied by the source at the front end to control the brakes of the train and to govern the supply of current from the source at the rear end of the train, and an indicating device located at the manually operated means connected to the circuit and responsive only to current of the character supplied by the source at the rear end of the train.

2. A brake control system for railway trains including, two points on a train spaced apart having an electric circuit extending between them with a source of direct current at one point and a source of alternating current at the other, a manually operated means located at the point having the direct current source to control the supply of direct current, a brake controlling means connected to the circuit at the point having the alternating current source responsive to direct current to control the brakes of the train and to control the supply of alternating current, and an indicating device located at the manually operated means connected to the circuit responsive to the alternating current.

3. A brake control system for railway trains including, two points on a train spaced apart having an electric circuit extending between them with a source of direct current at one point and a source of alternating current at the other, a manually operated means located at the point having the direct current source to control the supply of direct current, a brake controlling means connected to the circuit at the point having the alternating current source responsive to direct current to control the brakes of the train and to control the supply of alternating current, an indicating device located at the manually operated means connected to the circuit responsive to the alternating current, and means for preventing the alternating current from influencing the brake controlling means and for preventing the direct current from influencing the indicating device.

4. Apparatus for the control of railway train brakes comprising, in combination with the usual engineer's brake valve on the locomotive having several different positions for establishing several different conditions of brake pipe pressure; auxiliary brake controlling mechanism at another location on the train capable of reproducing a running, a lap and a brake applying condition of the brake pipe pressure established by the engineer's brake valve; a source of direct current on the locomotive; means to establish one polarity of the direct current, the reverse polarity and to periodically alternate the polarity for a running, a brake applying and a lap condition of the engineer's valve respectively; a single metallic channel for conveying the direct current from the locomotive to said other location, and means at said other location connected to the conducting channel selectively responsive to the different polarities of the direct current and to the periodic alternating of the polarity for causing the auxiliary brake controlling mechanism to register with the engineer's brake valve.

5. Apparatus for controlling the brake pipe pressure on a railway train in combination with the usual engineer's brake valve device on the locomotive operable to effect different conditions in brake pipe pressure, auxiliary means at another point on the train including an independent source of air pressure operable to reproduce the different conditions in brake pipe pressure of the engineer's brake valve device, controlling means selectively responsive to different conditions of electric energy for causing the auxiliary means to assume its different conditions, and means including a single metallic circuit between the locomotive and said other point rendered active to supply different conditions of electric energy to the controlling means in accordance with the position of the engineer's brake valve device for causing the auxiliary mechanism to register with the engineer's device.

6. A brake control system for a railway train in combination with the usual engineer's brake valve on the locomotive having different conditions for establishing different conditions of the train brakes, an auxiliary brake controlling mechanism located at another point on the train capable of reproducing a given condition of the engineer's brake valve, a conducting channel for electric energy between the locomotive and said other point, means rendered active to supply direct current energy to said conducting channel in response to the engineer's brake valve moved to said given condition, a source of alternating current energy, means at said other point influenced by said conducting channel responsive to the direct current energy for causing the auxiliary mechanism to assume the given condition and to supply from said source alternating current energy to the conducting channel, and an indicating device on the locomotive influenced by said conducting channel responsive to the alternating current energy.

7. A brake control system for a railway train in combination with the usual engineer's brake valve on the locomotive operable to several different positions to establish several different conditions of brake pipe pressure, an auxiliary brake controlling mechanism located at another point on the train capable of reproducing the several conditions of the brake pipe pressure established by the engineer's brake valve, a single metallic circuit for electric current between the locomotive and said other point, means on the locomotive to apply to said circuit a different predetermined condition of direct current energy for each position of the engineer's brake valve, a source of alternating current at said other point, means at said other location connected to said circuit selectively responsive to the different conditions of direct current energy for causing the auxiliary brake controlling mechanism to reproduce the condition of brake pipe pressure established by the brake valve on the locomotive and to connect said source of alternating current to said circuit, and an indicating device on the locomotive connected to said circuit responsive to the alternating current.

8. A brake control system for railway trains including, two points on a train spaced apart having an electric circuit extending between them with a source of direct current at one point and a source of alternating current at the other, a manually operated means located at the point having the direct current source adapted to supply to the circuit different conditions of direct current, a brake controlling mechanism capable of effecting different conditions of the train brakes, controlling means located at the point having the alternating current source connected to said circuit and selectively responsive to different conditions of direct current for causing the brake controlling mechanism to establish the brake condition corresponding to the condition selected by the manually operated means, circuit means rendered active to supply alternating current to the circuit in response to the brake controlling means establishing the selected brake condition, and an indicating device associated with the manually operated means rendered active by the alternating current.

9. A brake control system for railway trains including, two points on a train spaced apart having an electric circuit extending between them with a source of direct current at one point and a source of alternating current at the other, a manually operated means located at the point having the direct current source adapted to supply to the circuit different conditions of direct current, a brake controlling mechanism capable of effecting different conditions of the train brakes, controlling means located at the point having the alternating current source connected to said circuit and selectively responsive to different conditions of direct current for causing the brake controlling mechanism to establish the brake condition corresponding to the condition selected by the manually operated means, circuit means rendered active to supply alternating current to the circuit in response to the brake controlling means establishing the selected brake condition, an indicating device associated with the manually operated means rendered active by the alternating current, and means for preventing the alternating current from influencing the controlling means and for preventing the direct current from influencing the indicating device.

10. A brake control system for a railway train in combination with the usual engineer's brake valve on the locomotive having different positions for establishing different functional conditions of brake pipe pressure, an auxiliary brake controlling mechanism located at another point on the train capable of reproducing different functional conditions of the engineer's brake valve, two metallic conductors extending between the locomotive and said other point to convey electric energy between the two locations for causing the auxiliary brake controlling mechanism to register with the engineer's brake valve, and means connected to said conductors for simultaneously establishing similar brake applying conditions at both the locomotive and at said other point upon a break or cross of said two metallic conductors.

11. Apparatus for the control of railway train brakes comprising, in combination with the engineer's brake valve on the locomotive operable to different positions for establishing a running, a lap and a brake applying condition of brake pipe pressure; an auxiliary brake controlling mechanism at another location on the train capable of reproducing the running, lap and brake applying conditions of the brake pipe pressure established by the engineer's brake valve; a circuit for conveying electric energy between the two locations, means controlled by the engineer's brake valve for applying to said circuit direct current of one polarity, direct current of the reverse polarity and direct current periodically alternating in polarity in the running, brake applying and the lap positions respectively, and means at said other location connected by the circuit selectively responsive to the different polarities of the direct current and to the direct current periodically alternating in polarity for causing the auxiliary brake controlling mechanism to register with the engineer's brake valve.

12. Apparatus for the control of railway train brakes comprising, in combination with the engineer's brake valve on the locomotive operable to different positions for establishing a running, a lap and a brake applying condition of brake pipe pressure; an auxiliary brake controlling mechanism at another location on the train capable of reproducing the running, lap and brake applying conditions of the brake pipe pressure established by the engineer's brake valve; an electric circuit between the two locations, means controlled by the engineer's brake valve for applying to the electric circuit direct current of one polarity, direct current of the reverse polarity and direct current periodically alternating in polarity in the running, brake applying and the lap positions respectively, a polar and a neutral relay at said other location connected to said circuit selectively responsive to the different polarities of the direct current and to direct current periodically alternating in polarity, and circuit means controlled jointly by said polar and neutral relays for causing the auxiliary brake controlling mechanism to register with the engineer's brake valve.

13. Apparatus for the control of railway train brakes comprising, in combination with the engineer's brake valve on the locomotive operable to a given position for establishing a predetermined condition of the brake pipe pressure, an auxiliary mechanism at another location on the train capable of reproducing said predetermined condition of brake pipe pressure established by the engineer's valve, an electric circuit between the two locations, means rendered active by the engineer's valve in said given position for supplying to the circuit direct current periodically alternating in polarity, a polar relay connected to said circuit operated by said direct current periodically alternating in polarity, and circuit means controlled by said polar relay for causing said auxiliary mechanism to establish said predetermined condition of brake pipe pressure.

14. Apparatus for the control of railway trains in combination with an engineer's brake valve on the locomotive operable to a given position for establishing a predetermined condition of brake pipe pressure, an auxiliary mechanism at another point on the train capable of reproducing said predetermined condition of brake pipe pressure, an electric circuit, means for supplying direct current periodically varied in a predetermined manner to said electric circuit in response to the engineer's brake valve operated to said given position, means at said other point controlled by said circuit and responsive to direct current varied in said predetermined manner for causing the auxiliary mechanism to establish said predetermined condition of brake pipe pressure, means controlled by said auxiliary mechanism for supplying steady alternating current to said circuit, and indication means at said locomotive controlled by said circuit and responsive to steady alternating current.

15. A brake control system for railway trains including, a manually operated means having different brake controlling positions and located at one point on a train, a brake controlling mechanism located at another point on the train and including a first device which when deenergized establishes a given brake applying condition of the usual brake pipe pressure, an electric circuit comprising at least one metallic conductor extending between the two locations, a current source at said first mentioned location rendered active at times by said manually operated means to supply a control current to the electric circuit for causing the brake controlling mechanism to establish a condition in which said first device is energized, a current source at said other location rendered active to supply an indication current to the electric circuit in response to the establishing of said condition by the brake controlling mechanism, a second device located at the first mentioned location adapted when deenergized to also establish said brake applying condition of the brake pipe pressure and arranged to be energized by said indication current whereby a break of said metallic conductor causes the establishing of said brake applying condition of brake pipe pressure at both locations substantially simultaneously.

FRANK H. NICHOLSON.